United States Patent
Robertson et al.

(10) Patent No.: US 9,701,406 B2
(45) Date of Patent: Jul. 11, 2017

(54) CONVERTIBLE TILTROTOR AIRCRAFT

(71) Applicant: Bell Helicopter Textron Inc., Fort Worth, TX (US)

(72) Inventors: Daniel B. Robertson, Southlake, TX (US); Dudley E. Smith, Arlington, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 295 days.

(21) Appl. No.: 14/566,844

(22) Filed: Dec. 11, 2014

(65) Prior Publication Data

US 2016/0229531 A1 Aug. 11, 2016

(51) Int. Cl.
*B64C 29/00* (2006.01)
*B64C 11/28* (2006.01)
*B64D 35/04* (2006.01)
*B64C 39/04* (2006.01)

(52) U.S. Cl.
CPC .......... *B64C 29/0033* (2013.01); *B64C 11/28* (2013.01); *B64C 39/04* (2013.01); *B64D 35/04* (2013.01)

(58) Field of Classification Search
CPC . B64C 29/0033; B64C 11/28; B64C 39/0033; B64D 29/02; B64D 35/04; B64D 35/00; F16H 3/66

See application file for complete search history.

(56) References Cited

U.S. PATENT DOCUMENTS

| | | | | | |
|---|---|---|---|---|---|
| 2,095,207 | A | * | 10/1937 | Walter | F16K 37/00 409/185 |
| 2,478,847 | A | * | 8/1949 | Stuart | B64C 29/0033 244/233 |
| 2010/0072325 | A1 | * | 3/2010 | Sambell | B64C 11/28 244/7 A |
| 2016/0123431 | A1 | * | 5/2016 | Ong | F16H 3/66 475/275 |
| 2016/0195171 | A1 | * | 7/2016 | Kim | F16H 3/666 475/275 |

OTHER PUBLICATIONS

Kenneth Kaplan, Variable Ratios From Planetaries . . . How to Calculate the Speed of Any Element When All Elements Are Rotating, Aug. 17, 1967, 2 pages.

Harry Walton, The How and Why of Mechanical Movements: Exactly How Machines Work: Engines, Turbines, Transmissions, Brakes, Clutches, Rockets, Atomic Generators, Gyroscopes, Guidance Systems, Jan. 1, 1968, 4 pages.

U.S. Appl. No. 14/202,826, filed Mar. 10, 2014, having inventors Daniel B. Robertson, Dudley E. Smith, Carlos A. Fenny, and Walter West Riley.

* cited by examiner

*Primary Examiner* — Philip J Bonzell
(74) *Attorney, Agent, or Firm* — Alison A. Woodruff

(57) ABSTRACT

A rotorcraft includes a proprotor coupled to the wing and a pusher propeller. Power is transferred from the proprotor to the pusher propeller with the use of a torque splitter. The torque splitter contains several gears, including a ring gear which rotates on an axis. The power outputted by the torque splitter is increased or decreased by selectively slowing down the rotation of the ring gear by the use of a clamp.

20 Claims, 12 Drawing Sheets

CONVERTIBLE TILTROTOR AIRCRAFT

BACKGROUND

Technical Field

This present disclosure relates generally to tiltrotor aircraft, and more particularly, to a tiltrotor aircraft with foldable rotor blades and a pusher propeller.

Description of Related Art

One example of an aircraft is a tiltrotor. A tiltrotor aircraft may operate in a helicopter mode by positioning the nacelles upright and in an airplane mode by positioning the nacelles forward. Tiltrotor aircraft may generate greater forward speed in airplane mode than in helicopter mode because, in airplane mode, the rotor blades are oriented to generate greater thrust propelling the aircraft forward (somewhat analogous to a propeller). Tiltrotor aircraft may generate an even greater speed in high-speed mode than in airplane mode because, in high-speed mode, additional thrust is generated by a jet engine or convertible engine that provides thrust power. However, there is a need for a tiltrotor aircraft to generate additional forward speed without the use of a jet engine or convertible engine.

DESCRIPTION OF THE DRAWINGS

The novel features believed characteristic of the method and apparatus of the present disclosure are set forth in the appended claims. However, the method and apparatus itself, as well as a preferred mode of use, and further objectives and advantages thereof, will best be understood by reference to the following detailed description when read in conjunction with the accompanying drawings, wherein:

DETAILED DESCRIPTION OF THE DRAWINGS

Illustrative embodiments of the method and apparatus of the present disclosure are described below. In the interest of clarity, all features of an actual implementation may not be described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

Figure 1:
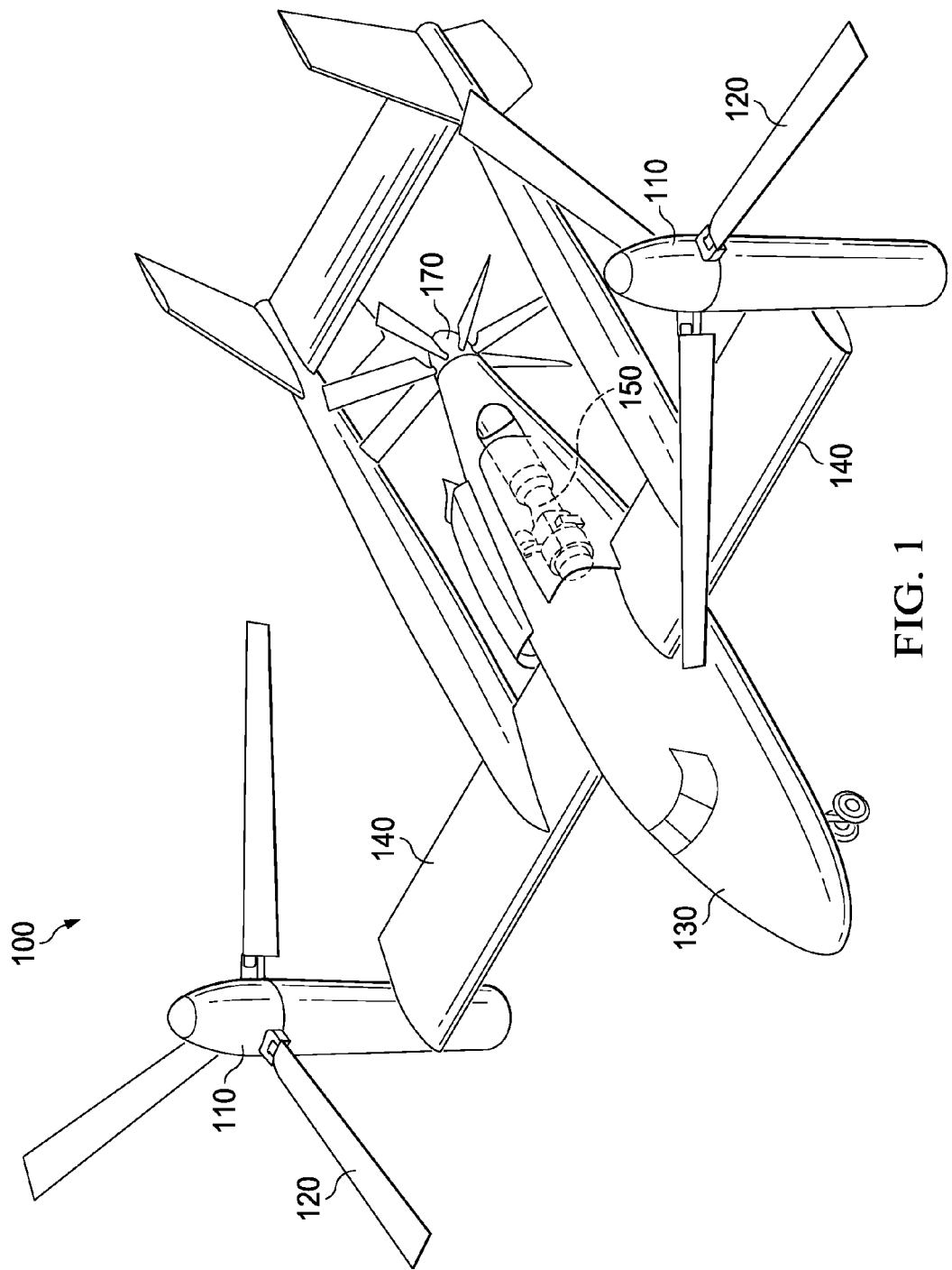
FIG. 1 is a perspective view of a tiltrotor aircraft in helicopter mode, according to one example embodiment.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be FIG. 1 shows a rotorcraft 100 according to one example embodiment. Rotorcraft 100 features one or more proprotors 110, blades 120, a fuselage 130, and a wing 140. Proprotor 110 can pivot each blade 120 along a folding axis 190. Proprotor 110 can include a control system for selectively controlling the pitch of each blade 120 in order to selectively control direction, thrust, and lift of rotorcraft 100. In the example of FIG. 1, rotorcraft 100 represents a tiltrotor aircraft, and proprotor 110 features rotatable nacelles. In this example, the position of the nacelles, as well as the pitch of rotor blades 120, can be selectively controlled in order to selectively control direction, thrust, and lift of rotorcraft 100. Fuselage 130 represents the main body of rotorcraft 100 and can be coupled to one or more proprotors 110 (e.g., via wing 140) such that proprotor 110 and blades 120 can move fuselage 130 through the air. Wing 140 can also generate lift during forward flight.

Teachings of certain embodiments relating to rotor systems described herein can apply to proprotor 110 and/or other rotor systems, such as non-tilting rotor and helicopter rotor systems. It should also be appreciated that teachings of rotorcraft 100 can apply to unmanned aircraft.

Figure 2:
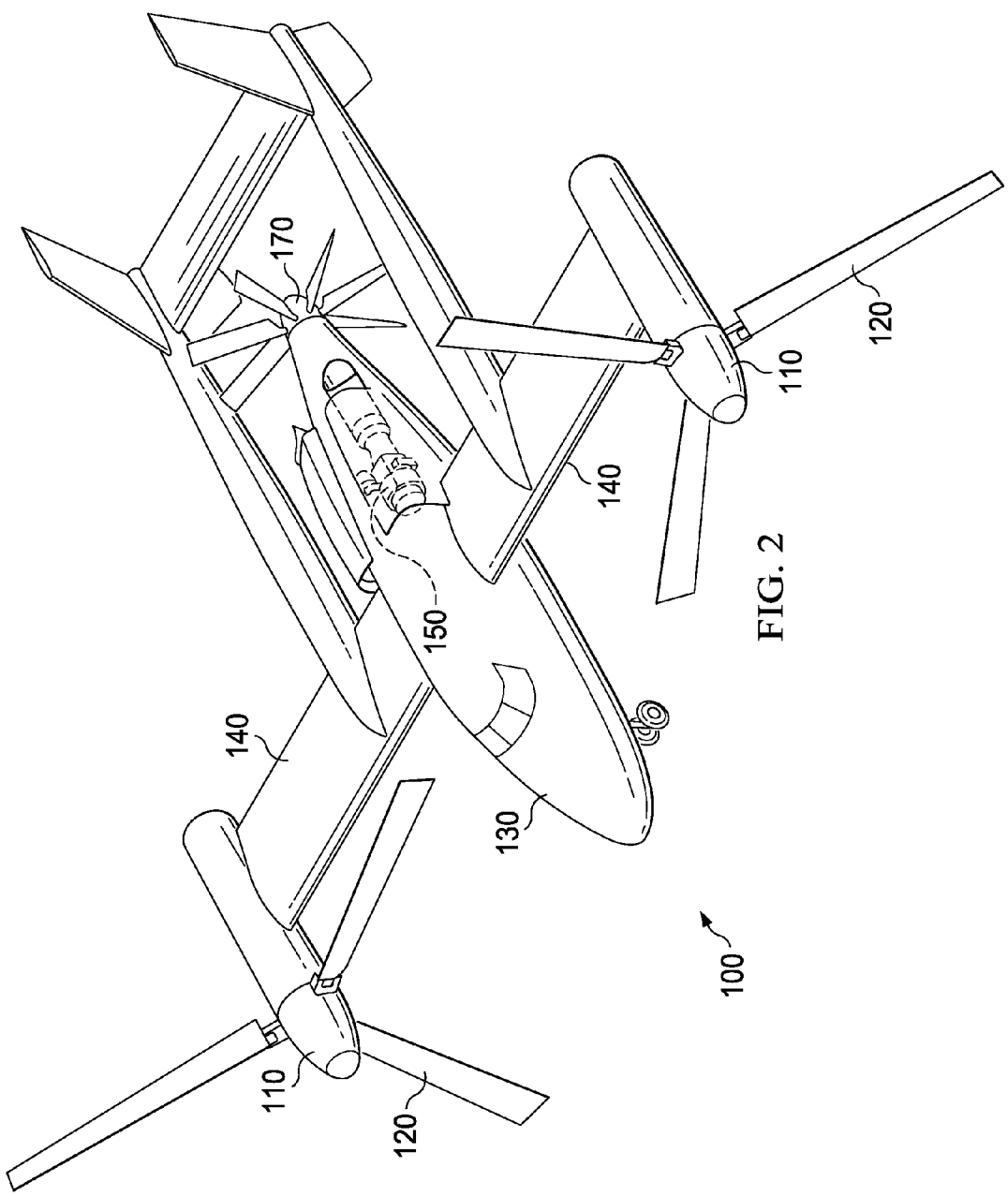
FIG. 2 is a perspective view of a tiltrotor aircraft in high-speed mode, according to one example embodiment.

In the example of FIG. 1, rotorcraft 100 can operate in helicopter mode by positioning the nacelles upright and in airplane mode by positioning the nacelles forward, as seen in FIG. 2. Rotorcraft 100 can generate greater forward speed in airplane mode than in helicopter mode because, in airplane mode, blades 120 can be oriented to generate forward thrust (somewhat analogous to a propeller).

Figure 3:
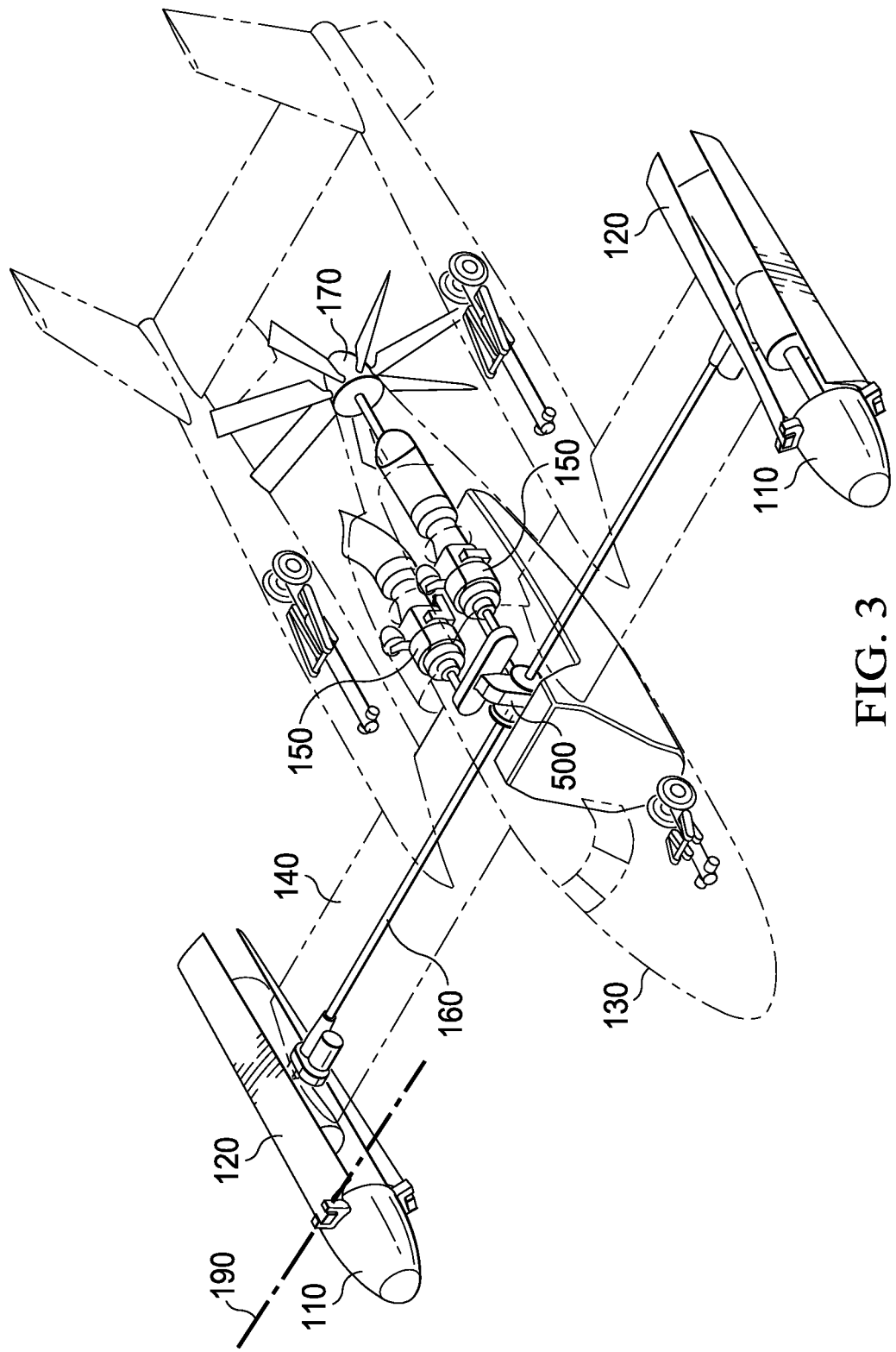
FIG. 3 is a perspective view of a tiltrotor aircraft in high-speed mode, according to one example embodiment.

Teachings of certain embodiments recognize the ability of aircraft such as rotorcraft 100 to generate additional forward thrust (in addition to or in place of the forward thrust generated by blades 120). For example, rotorcraft 100 can be equipped with pusher propeller 170 that provides additional forward thrust. In the example of FIG. 3, pusher propeller 170 is mounted to fuselage 130 and can be powered by one or more engine 150. Engine 150 can also power one or more proprotor 110. Power can be transferred through torque split gearbox 500, then through cross shaft 160, then to proprotor 110. In another example embodiment, pusher propeller 170 is a ducted fan.

Regardless of the mechanism for providing additional forward thrust, teachings of certain embodiments recognize that the existence of blades 120 can place an upper limit on the forward speed of the aircraft. For example, the efficiency of a propeller decreases dramatically as the helical speed of the rotor approaches high Mach numbers, resulting in excessive power consumption. Pusher propeller 170 rotational velocity can be matched to a higher forward flight speed since it is not constrained by hover weight and power limitations.

Accordingly, teachings of certain embodiments recognize the capability to fold blade 120 along a folding axis 190 to reduce aerodynamic forces on blade 120 during high-speed forward flight. FIG. 3 shows rotorcraft 100 with blades 120 folded. In the example of FIG. 3, pusher propeller 170 can provide thrust during forward flight, and wing 140 can generate lift. In this example, blades 120 that are in the folded position can result in less drag than when blades 120 are in the extended position, as shown in FIG. 2.

Teachings of certain embodiments also recognize that the ability to safely and efficiently fold blade 120, and therefore increase the forward-speed of the aircraft. One example embodiment allows blade 120 to be somewhat flatter (have less blade twist) than, for example, typical tiltrotor blades. For example, conventional tiltrotor blades can operate in two modes: helicopter mode and airplane mode. Some tiltrotor blades can include additional twist to improve performance during airplane mode. Folding blades, however, may not spend much time in airplane mode, and therefore, performance in airplane mode may not be a primary concern. For example, in some embodiments, airplane mode can represent a relatively-short transition period between helicopter mode and high-speed mode when blades 120 are folded. In this example, folding blades 120 can be designed primarily for helicopter mode, which can allow for somewhat flatter blade designs.

In addition, teachings of certain embodiments recognize that reducing twist in tiltrotor blades can improve folding performance of blades 120. For example, as will be explained in greater detail below, teachings of certain embodiments recognize that driving all blade leading edges "edge-on" into the airstream can reduce aerodynamic loads on the blades during blade folding. A highly-twisted blade, however, may not be able to become fully edge-on because, even if a portion of the blade leading edges are driven into the airstream, the blade twist causes at least part of each blade to be "end flat" relative to the airstream. A blade surface that is "end flat" may have higher aerodynamic loads than a blade surface that is edge-on. Unlike a highly-twisted blade, a blade with less twist may be able to drive a greater percentage of the blade leading edges into the airstream while having a lower percentage of the blade surfaces "end flat" relative to the airstream. Accordingly, teachings of certain embodiments recognize that reducing twist in blades 120 may improve folding performance by reducing aerodynamic loads on blades 120 during the folding process.

In some embodiments, operation of proprotor 110 can be organized into five operation phases: helicopter mode, conversion mode, airplane mode, folding mode (may also be referred to as transition mode), and high-speed mode. In helicopter mode, for example, the nacelles are positioned upright to generate greater lift.

In conversion mode, proprotor 110 can convert from helicopter mode to airplane mode. For example, in some embodiments, proprotor 110 can convert from helicopter mode to airplane mode by positioning the nacelles from an upright position to a forward position, which can result in blades 120 generating greater forward thrust.

In folding mode, rotorcraft 100 can also convert from airplane mode to high-speed mode by folding rotor blades 120 back. In one example embodiment, power can be decreased or halted to proprotors 110 and diverted to pusher propeller 170 at a specified speed, by the use of torque split gearbox 500.

One benefit of having a configuration where rotorcraft 100 contains foldable proprotor 110, pusher propeller 170, and torque split gearbox 500 is that when power from engine 150 is diverted to pusher propeller 170, the power to pusher propeller 170 is increased. Therefore, the power to pusher propeller 170 is greater in high-speed mode than in airplane mode.

Another benefit of having a configuration where rotorcraft 100 contains foldable proprotor 110, pusher propeller 170, and torque split gearbox 500 is that the use of a convertible engine, turbo fan, or turbo jet engine is unnecessary. A convertible engine is an engine that can output shaft power in helicopter or airplane mode, and thrust power in high-speed mode. The disadvantage of a convertible engine is that they can be both uncommon and very expensive. The disadvantage of using jet engines is that you would need a separate turbo shaft engine to provide shaft power. Therefore, the configuration of rotorcraft 100 only requires the use of one or more turbo shaft engine, which can decrease the cost of rotorcraft 100.

Figure 4:
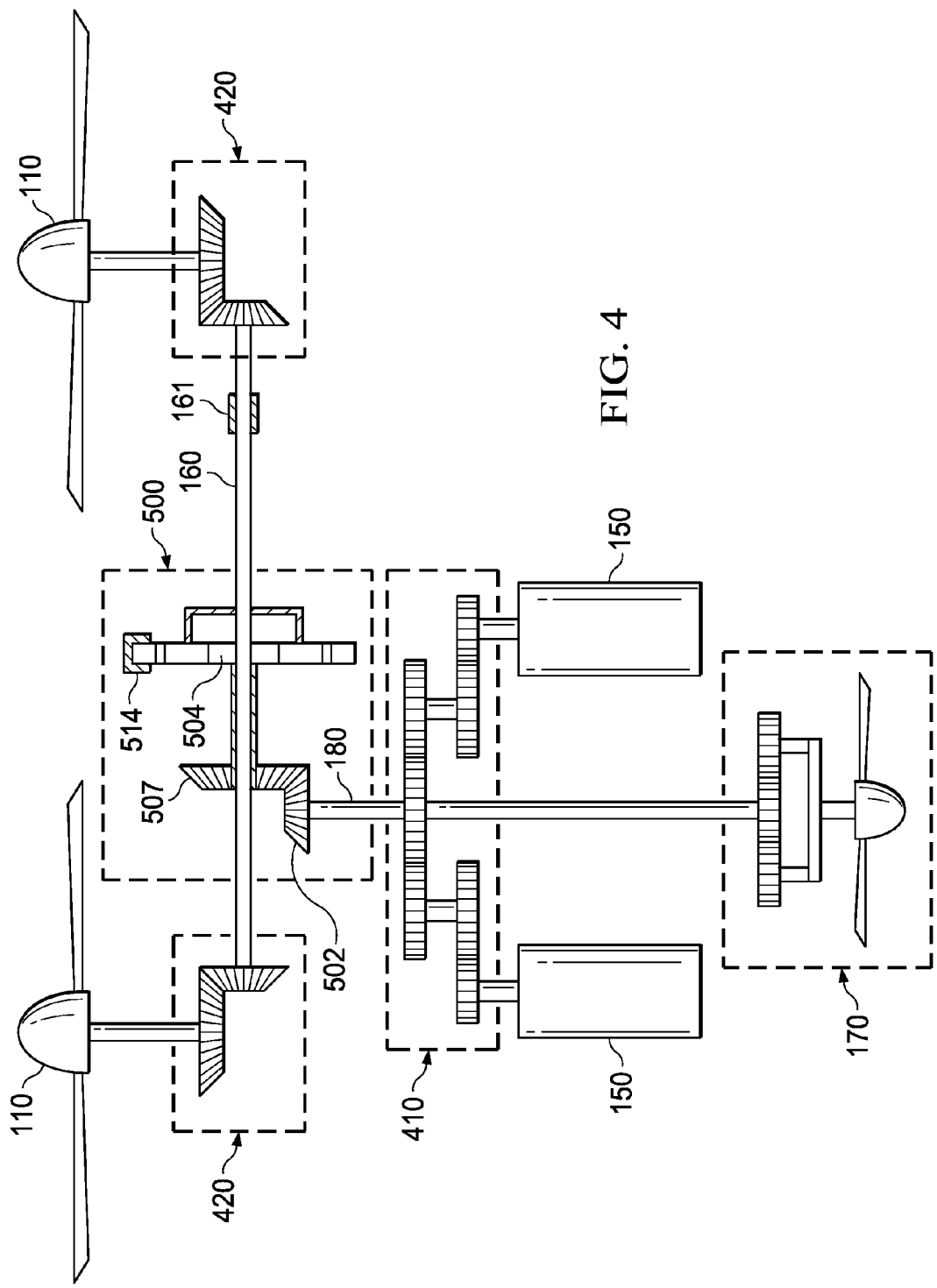
FIG. 4 is a schematic of a tiltrotor aircraft with two engines, according to one example embodiment.

Now referring to FIG. 4, aircraft 100 may have two engines 150. Power can be transferred from two engines 150 to combining gearbox 410. Combining gearbox 410 can represent any device that can be capable of combining the power of two or more sources and outputs the power into one output. It may contain a plurality of gears to transition the power from two or more engines to a driveshaft. In one example embodiment, which is shown in FIG. 4, the power of two engines 150 is combined and then output to driveshaft 180. Driveshaft 180 then transfers power to spiral bevel gear 502 of torque split gearbox 500. Two or more engines 150 can also power pusher propeller 170.

Figure 5:
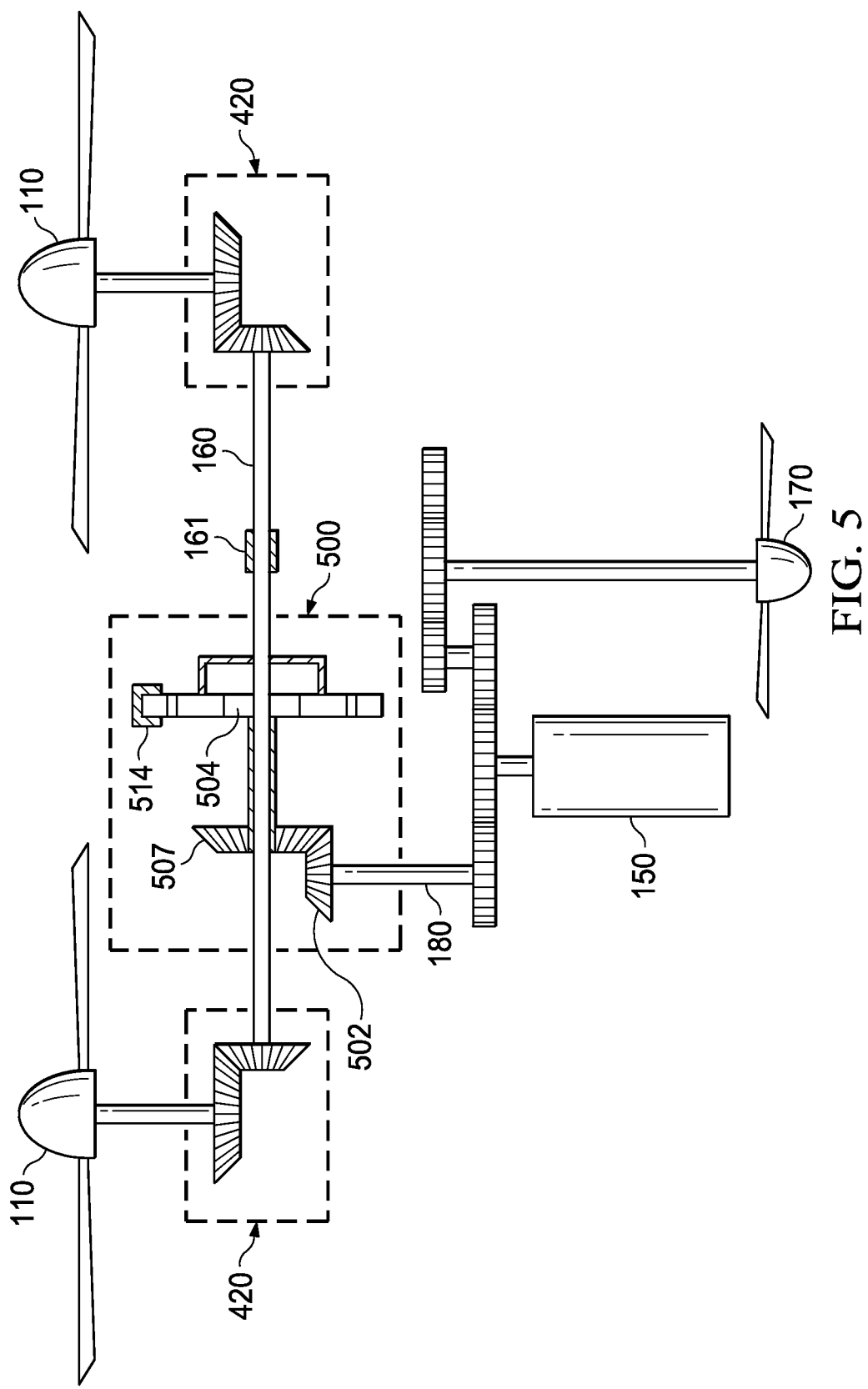
FIG. 5 is a schematic of a tiltrotor aircraft with one engine, according to one example embodiment.
Figure 6:
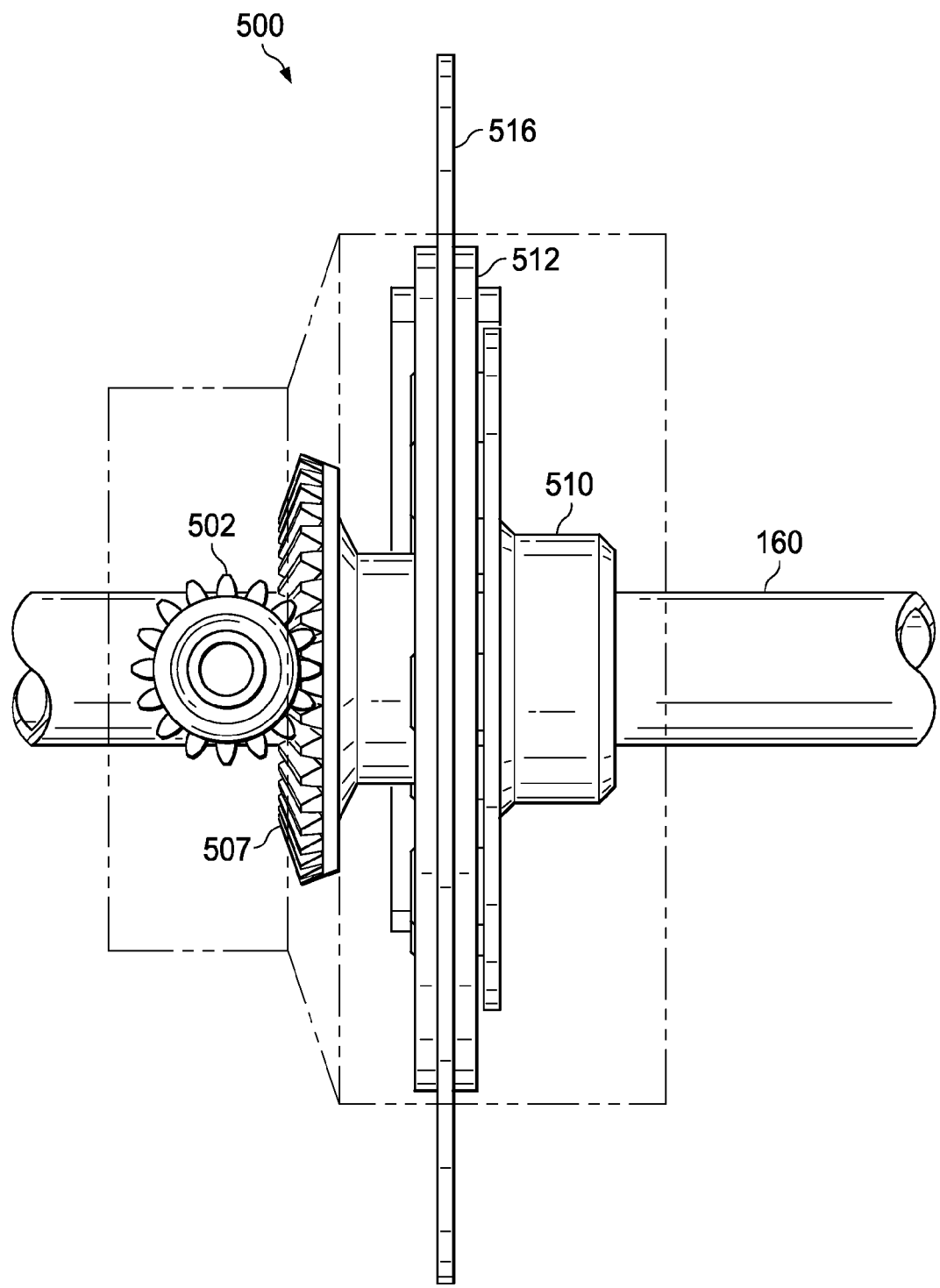
FIG. 6 is a side view of a torque split gearbox, according to one example embodiment.
Figure 7:
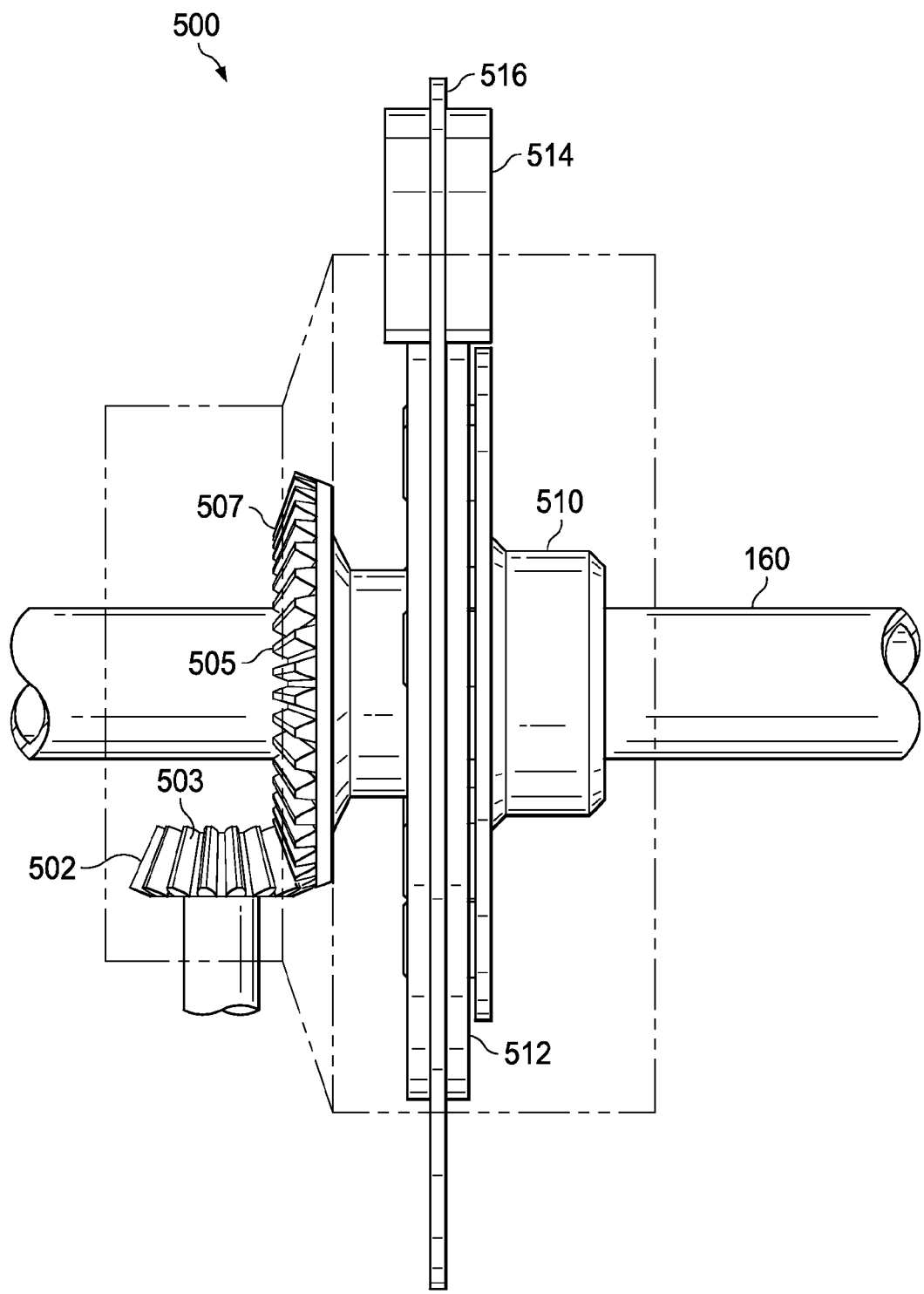
FIG. 7 is a top view of a torque split gearbox, according to one example embodiment.
Figure 8:
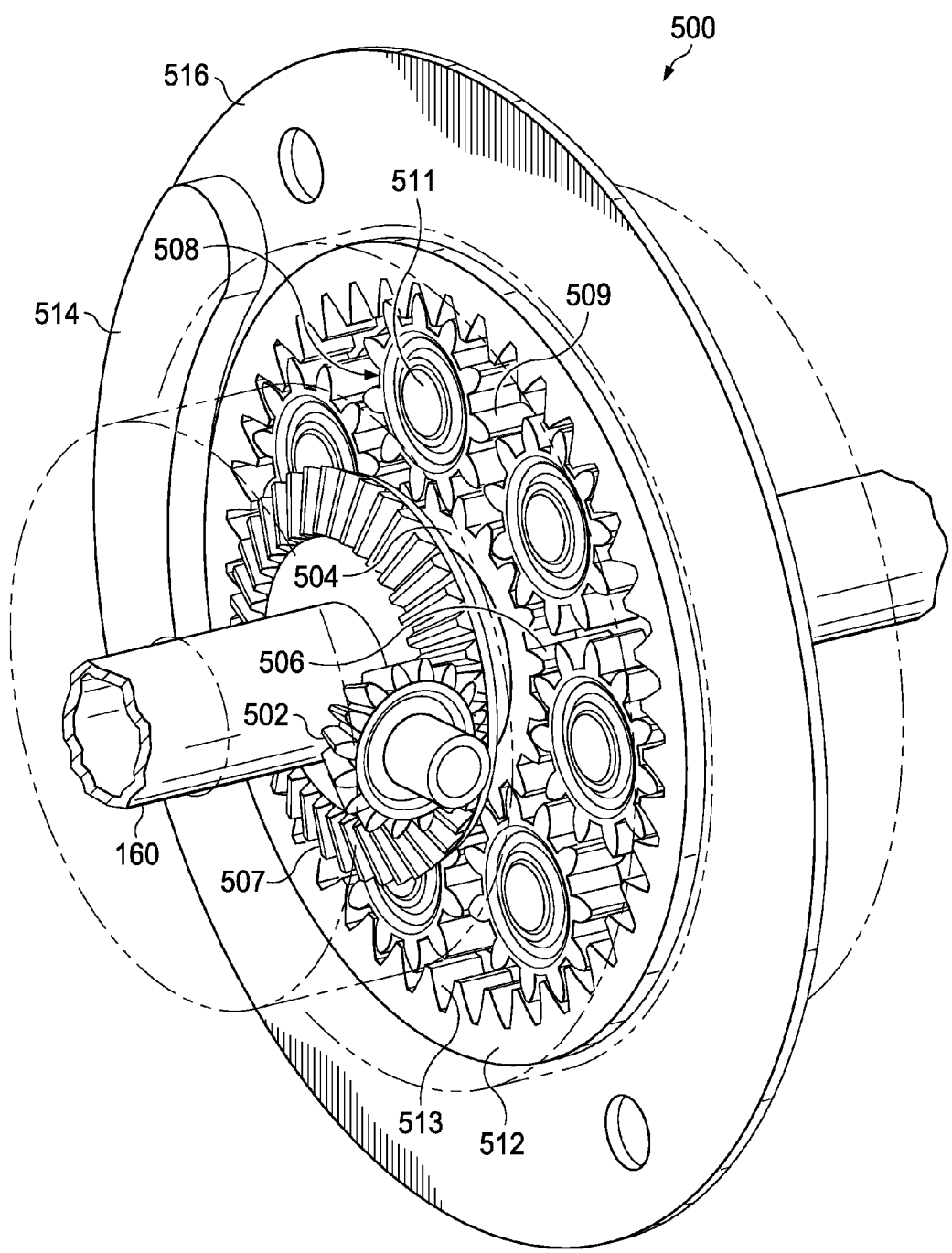
FIG. 8 is a perspective view of a torque split gearbox, according to one example embodiment.
Figure 9:
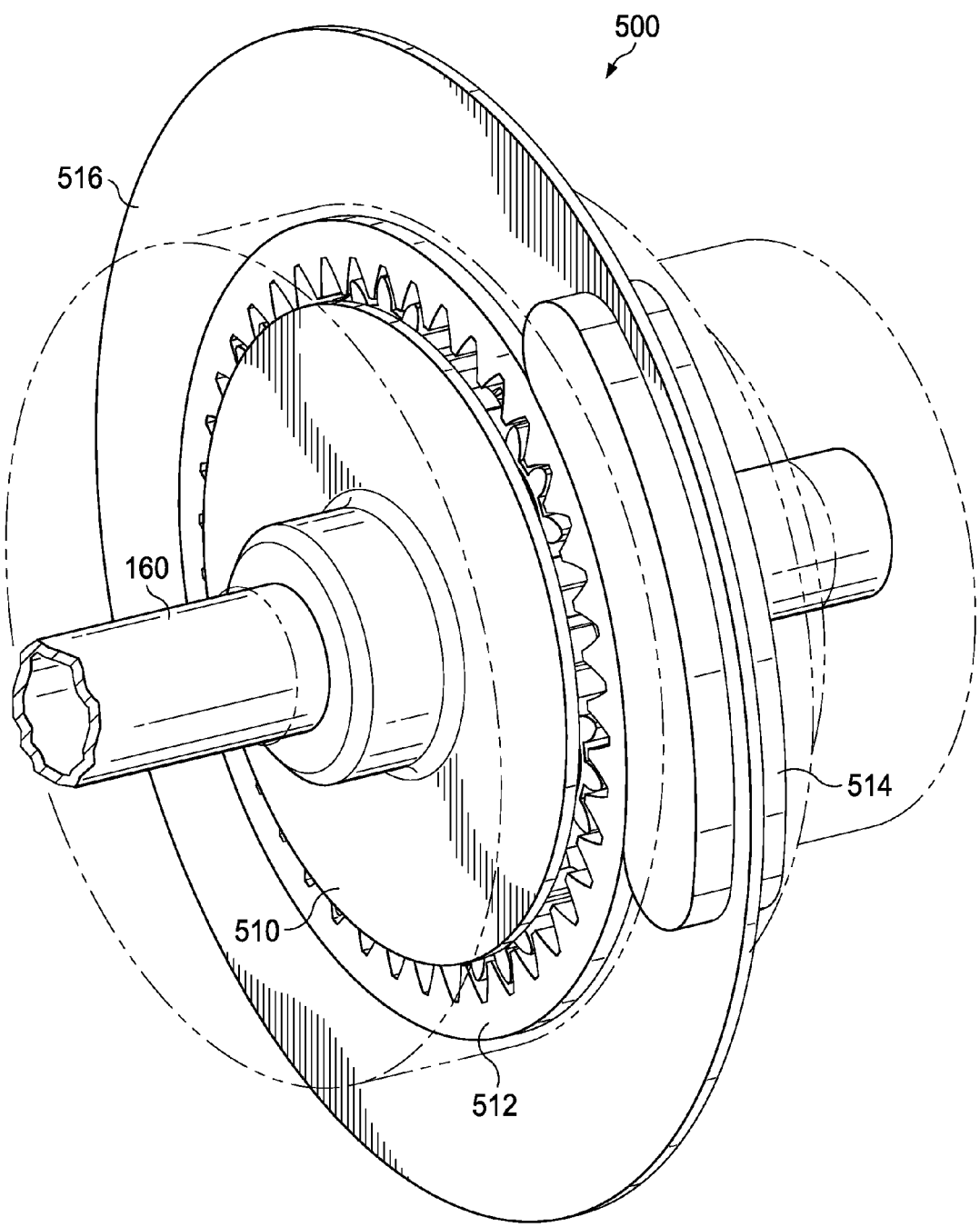
FIG. 9 is a perspective view of a torque split gearbox, according to one example embodiment.

In another example embodiment, which is shown in FIG. 5, aircraft 100 may only have one engine 150. Power can be transferred from engine 150 through a series of gears and then transferred to spiral bevel gear 502 of torque split gearbox 500 via driveshaft 180. The power of engine 150 can also be transferred to power pusher propeller 170 via a series of gears.

Torque split gearbox 500 can represent any device that allows power to be smoothly transferred from one device to another. Now referring to FIGS. 6-9 torque split gearbox 500 can include spiral bevel gear 502, spiral bevel gear 507, sun gear 504, cross shaft 160, planetary gears 508, planet carrier 510, ring gear 512, ring clamp 514, and disk 516. Spiral bevel gear 502 can be a gear where the outside is partially cone shaped and can contain teeth 503 that can be helical and located on the coned surface. Teeth 503 can be in mechanical communication with teeth 505 of spiral bevel gear 507. Spiral bevel gear 507 can also be partially cone shaped and can have teeth 505 that can be helical and located on a coned surface of spiral bevel gear 507. Spiral bevel gear 507 can be connected to sun gear 504. In another example embodiment, spiral bevel gear 507 and sun gear 504 are the same component. Sun gear 504 can contain teeth 506 that are located on an outer radial surface and can be in mechanical communication with teeth 509 of planetary gears 508. Planetary gears 508 can be cylindrical shaped having teeth 509 that can be located on an outer radial surface.

In one example embodiment, there are eight planetary gears 508 within torque split gearbox 500; however, in other example embodiments, more or less planetary gears 508 exist within torque split gearbox 500. Teeth 509 of planetary gear 508 can also be in mechanical communication with teeth 513 of ring gear 512. Ring gear 512 can be ring shaped having gear teeth 513 on an inner radial surface. Ring gear 512 can either be coupled to disk 516 or can be part of the same component as ring gear 512. Planetary gears 508 can be cylindrical shaped and can also be in mechanical communication with carrier shafts 511 of planet carrier 510. In another example embodiment, roller bearings are located between carrier shafts 511 and planetary gears 508. Planet carrier 510 can be coupled to cross shaft 160 with teeth and/or bolts.

Figure 10:
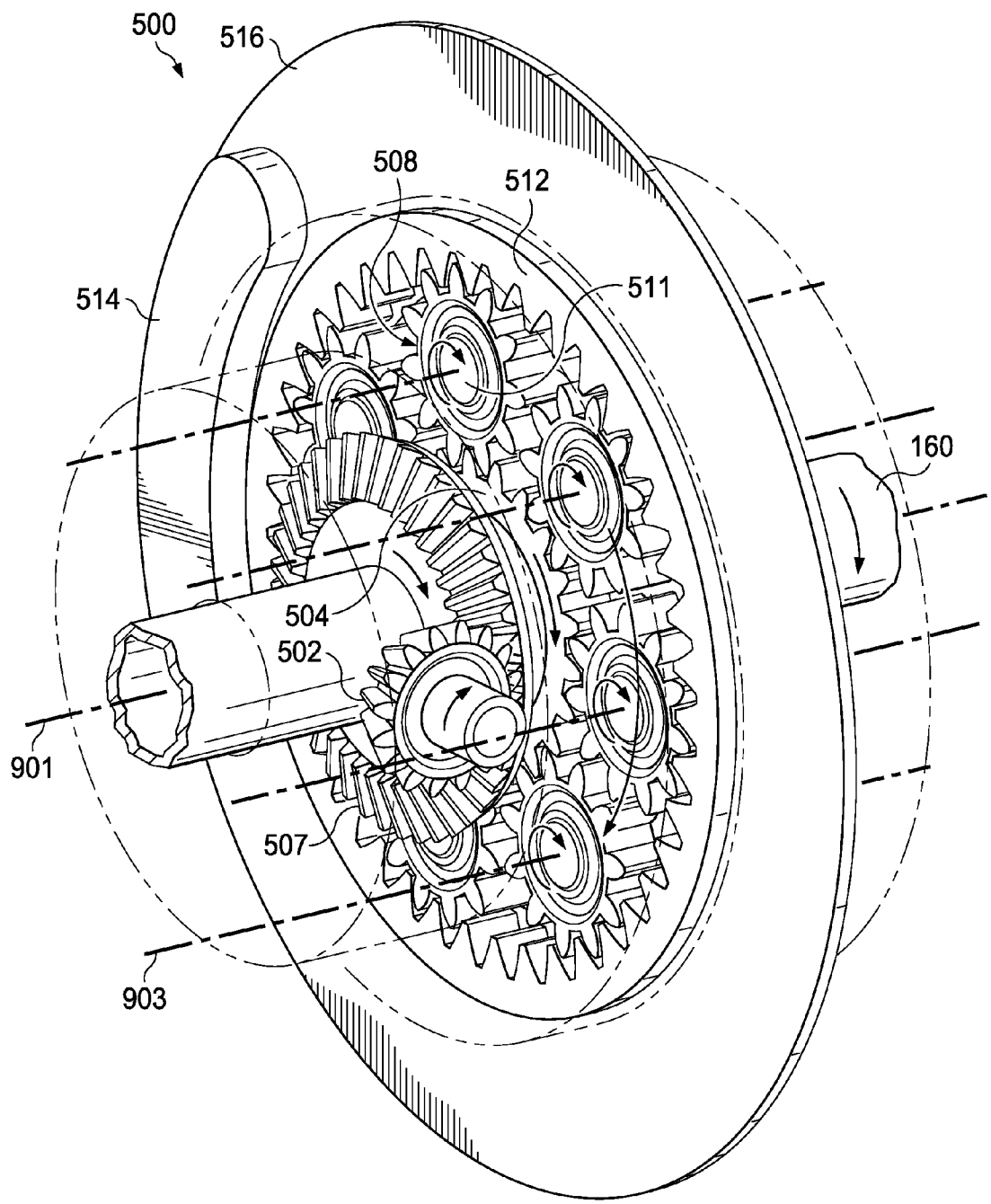
FIG. 10 is a perspective view of a torque split gearbox, according to one example embodiment.

Torque split gearbox 500 can also include a ring clamp 514 which can be selectively engaged and disengaged. When ring clamp 514 is engaged, as seen in FIG. 10, the clamp uses friction to prevent the rotation of disk 516 and ring gear 512, which causes power from spiral bevel gear 502 to be transferred to cross shaft 160. For example, spiral bevel gear 502 can rotate axially around an axis that is perpendicular to axis 901, and can transfer power to spiral bevel gear 507. Spiral bevel gear 507 can rotate on axis 901 and can transfer power to sun gear 504. Sun gear 504 can then transfer power to planetary gears 508. Each planetary gear 508 can each rotate around a planetary gear axis 903, which are each parallel to axis 901. Additionally, when ring clamp 514 is engaged and disk 516 and ring gear 512 are not allowed to move freely, planetary gears 508 can also rotate around sun gear 504. The rotation of planetary gears 508 around sun gear 504 can cause carrier shafts 511, along with planet carrier 510, to also rotate around axis 901. The rotation of planet carrier 510 can cause cross shaft 160 to rotate around axis 901. Thus, when ring clamp 514 is engaged, sun gear 504, planetary gears 508, planet carrier 510, and cross shaft 160 can all rotate around axis 901. The rotation of cross shaft 160 transfers power to proprotor gearbox 420, which powers proprotor 110, allowing rotorcraft 100 to be operated in helicopter mode or airplane mode.

Figure 11:
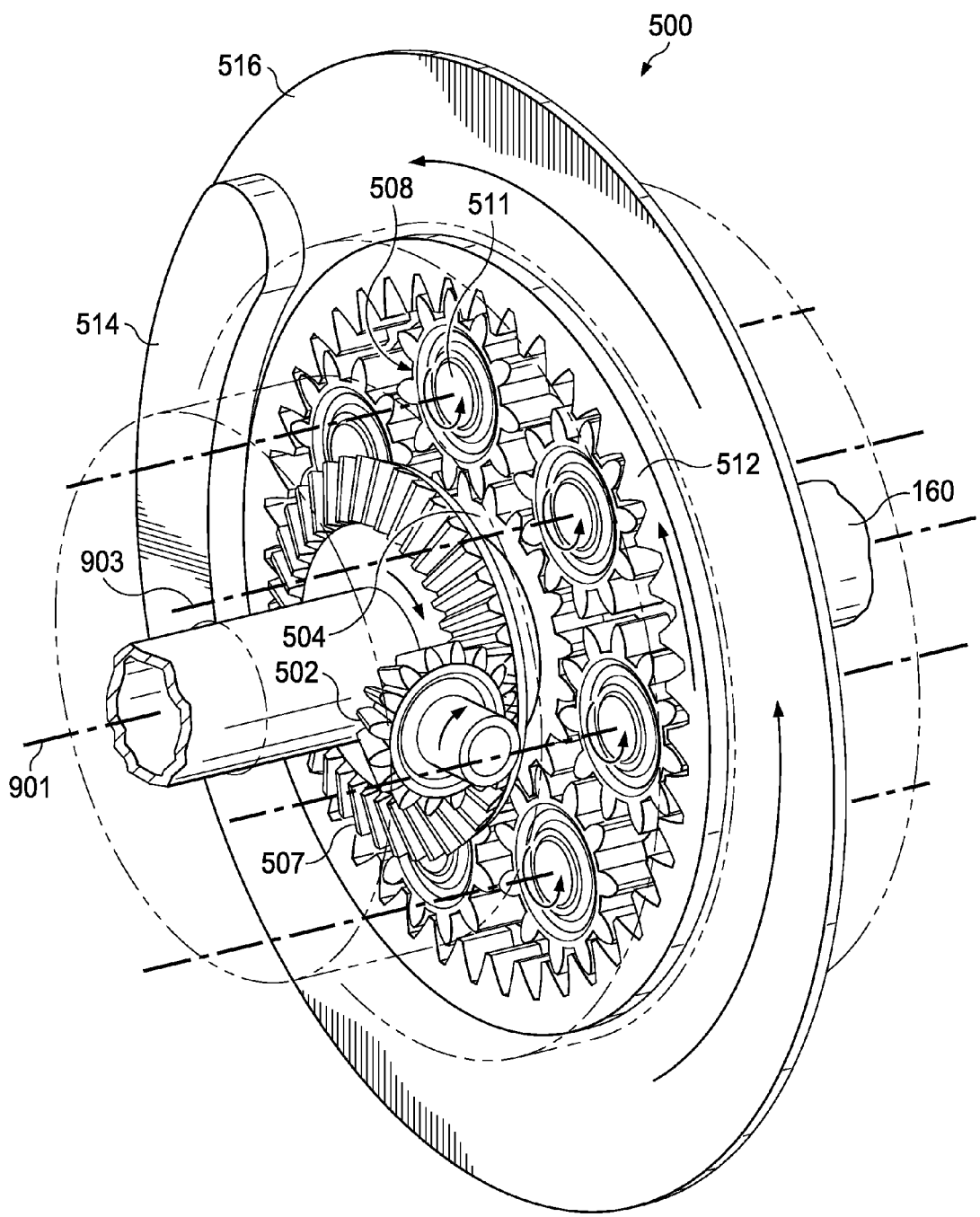
FIG. 11 is a perspective view of a torque split gearbox, according to one example embodiment.

When ring clamp 514 is disengaged, as seen in FIG. 11, ring gear 512 and disk 516 can rotate and rotorcraft 100 can be operated in high-speed mode. The free rotation of ring gear 512 reduces or halts the rotation of planetary gears 508 around sun gear 504 but allows planetary gears 508 and sun gear 504 to rotate on their own axes. Thus, planet carrier 510 and cross shaft 160 are prevented from rotating. In order to further halt the rotation of cross shaft 160, a cross shaft clamp 161 can be engaged onto cross shaft 160, as seen in FIGS. 4 and 5. Cross shaft clamp 161 may use friction to prevent cross shaft 160 from rotating.

Once the rotation of cross shaft 160 is halted, the power inputted and outputted from the one or more proprotor gearbox 420 can also be halted. Next, one or more proprotors 110 can be stopped and locked such that blades 120 cease spinning. A flapping lock can be engaged to prevent large flap displacements that result from the reduced centrifugal force. After engaging the flapping lock, the pitch of rotor blades 120 can be increased to stop rotor motion. The pitch of rotor blades 120 can be such that the blade leading edge is in the direction of the air stream to reduce aerodynamic loads on blade 120. Once the flapping lock is engaged, blades 120 can be folded.

In high-speed mode, rotorcraft 100 can also convert from high-speed mode to airplane mode by unfolding rotor blades 120 and increasing power to one or more proprotors 110. This increase of power can be accomplished by engaging ring clamp 514, which can allow power to be transmitted through cross shaft 160 and to one or more proprotor 110.

Figure 12:
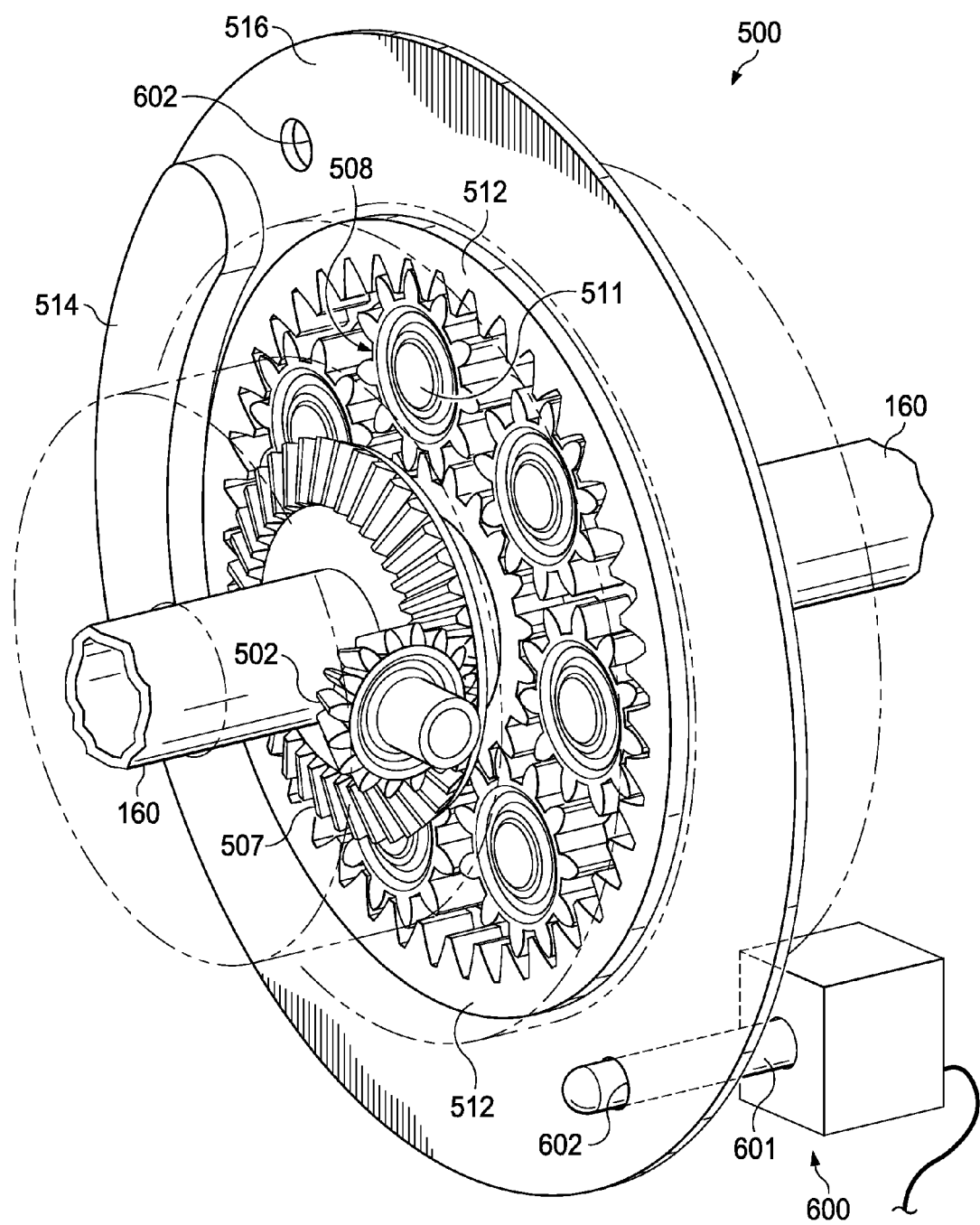
FIG. 12 is a perspective view of a torque split gearbox, according to one example embodiment.

Now referring to FIG. 12, another example embodiment is illustrated. After ring clamp 514 is engaged, and disk 516 is rotating slowly, disk 516 can also be fixed in a stationary position by the use of actuator 600. Actuator 600 may represent any device that can be configured to convert energy into linear motion. Actuator 600 can include a tapered pin 601 that can be extended and inserted into pin hole 602. Pin hole 602 can be located on disk 516 and pin 601 may be extended and inserted in pin hole 602. In one example embodiment, pin 601 is aligned and inserted in pin hole 602 by allowing ring clamp 514 to pulsate while pin 601 is extending. The pulsation of ring clamp 514 allows disk 516 to slowly, incrementally rotate. When pin 601 is aligned with a pin hole 602, pin 601 can be inserted into a pin hole 602. It should be understood that there can be one or a plurality of pin hole 602 located on disk 516.

One additional benefit of using torque split gearbox 500 to divert power is that power to proprotor 110 can be gradually increased or decreased as power is simultaneously diverted or directed to pusher propeller 170. Since the engagement and disengagement of ring clamp 514 can be done slowly, the transition of power from proprotor 110 to pusher propeller 170 can be done slowly and smoothly. The smooth, continuous power transition of torque split gearbox 500 is preferable over an instantaneous power transition in rotorcraft 100.

The particular embodiments disclosed herein are illustrative only, as the system and method may be modified and practiced in different but equivalent manners apparent to those skilled in the art having the benefit of the teachings herein. Modifications, additions, or omissions may be made to the system described herein without departing from the scope of the invention. The components of the system may be integrated or separated. Moreover, the operations of the system may be performed by more, fewer, or other components.

Furthermore, no limitations are intended to the details of construction or design herein shown, other than as described in the claims below. It is therefore evident that the particular embodiments disclosed above may be altered or modified and all such variations are considered within the scope and spirit of the disclosure. Accordingly, the protection sought herein is as set forth in the claims below.

To aid the Patent Office, and any readers of any patent issued on this application in interpreting the claims appended hereto, applicants wish to note that they do not intend any of the appended claims to invoke paragraph 6 of 35 U.S.C. §112 as it exists on the date of filing hereof unless the words "means for" or "step for" are explicitly used in the particular claim.

The invention claimed is:
1. A rotorcraft, comprising:
   a body;
   a wing coupled to the body;
   an engine;
   a first proprotor coupled to the wing, the first proprotor comprising:
      a plurality of blades;
   a shaft defining a first axis in mechanical communication with the first proprotor, wherein the shaft is configured to selectively rotate around the first axis;
   a pusher propeller; and
   a torque splitter comprising:
      a sun gear;
      a ring gear;
      a planet carrier in mechanical communication with the shaft;

a plurality of planetary gears, each in mechanical communication with the planet carrier and the ring gear and the sun gear; and a clamp associated with the ring gear, the clamp being configured to selectively prevent rotation of the ring gear.

2. The rotorcraft of claim 1, wherein the clamp is configured to selectively apply a frictional force on the ring gear.

3. The rotorcraft of claim 1, wherein a transfer of power from the engine to the shaft decreases as the clamp allows an increase to a rotational speed of the ring gear.

4. The rotorcraft of claim 1, wherein a transfer of power from the engine to the pusher propeller increases as the clamp allows an increase to a rotational speed of the ring gear.

5. The rotorcraft of claim 1, wherein a transfer of power from the engine to the shaft increases as the clamp decreases a rotational speed of the ring gear.

6. The rotorcraft of claim 1, wherein a transfer of power from the engine to the pusher propeller decreases as the clamp decreases a rotational speed of the ring gear.

7. The rotorcraft of claim 1, further comprising:
a shaft clamp associated with the shaft, the shaft clamp configured to selectively be engaged and to decrease a rotational speed of the shaft.

8. The rotorcraft of claim 1, wherein the ring gear further comprises:
a disk coupled to a perimeter of the ring gear; and
wherein the clamp is associated with the disk.

9. The rotorcraft of claim 1, wherein the blade is pivotable around a folding axis.

10. The rotorcraft of claim 1, further comprising:
a second proprotor;
wherein the shaft mechanically connects the first proprotor to the second proprotor.

11. The rotorcraft of claim 1, wherein the sun gear, the ring gear, and the planet carrier are rotatable on the first axis.

12. The rotorcraft of claim 1, wherein the torque splitter further comprises:
a spiral bevel gear in mechanical communication with the sun gear, wherein the spiral bevel gear is rotatable around a second axis that is perpendicular to the first axis.

13. The rotorcraft of claim 1, the torque splitter further comprising:
a hole through the ring gear;
an actuator;
a pin;
wherein the actuator is configured to displace the pin into the hole, thereby locking the ring gear.

14. The rotorcraft of claim 1, wherein the planet carrier is in direct mechanical engagement with the shaft.

15. A method of transferring the power from a proprotor to a pusher propeller in a rotorcraft, the method comprising:
providing a proprotor coupled to a wing of the rotorcraft;
providing a pusher propeller coupled to a body of the rotorcraft;
providing an engine coupled to the body of the rotorcraft;
providing a torque split gearbox comprising:
a sun gear rotating on an axis and in mechanical communication with a plurality of planetary gears;
the plurality of planetary gears rotating around the sun gear and in mechanical communication with a ring gear and a planet carrier, wherein the planet carrier is rotating on the axis; and
a clamp associated with the ring gear, wherein the clamp is engaged on the ring gear and prevents the ring gear from moving;
providing a shaft in mechanical communication with the planet carrier and the proprotor, and rotating on the axis; and
disengaging the clamp and allowing the ring gear to increase a ring gear speed of rotation around the axis.

16. The method of claim 15, wherein the torque split gearbox further comprises:
a spiral bevel gear in mechanical communication with the sun gear.

17. The method of claim 15, further comprising:
providing a shaft clamp associated with the shaft, wherein the shaft clamp is engaged on the shaft and prevents the shaft from moving.

18. The method of claim 17, further comprising:
engaging the shaft clamp and allowing the shaft to decrease a shaft speed of rotation around the axis.

19. The method of claim 15, wherein the torque splitter further comprises:
a disk coupled to the ring gear;
a hole through the disk;
an actuator; and
a pin;
wherein the actuator is configured to displace the pin into the hole, thereby locking the ring gear.

20. The method of claim 19, further comprising:
linearly displacing the pin so that the pin is outside the hole.

* * * * *